D. F. LEIDY.
BREAD SLICER.
APPLICATION FILED APR. 19, 1906.
907,153.
Patented Dec. 22, 1908.
2 SHEETS—SHEET 1.
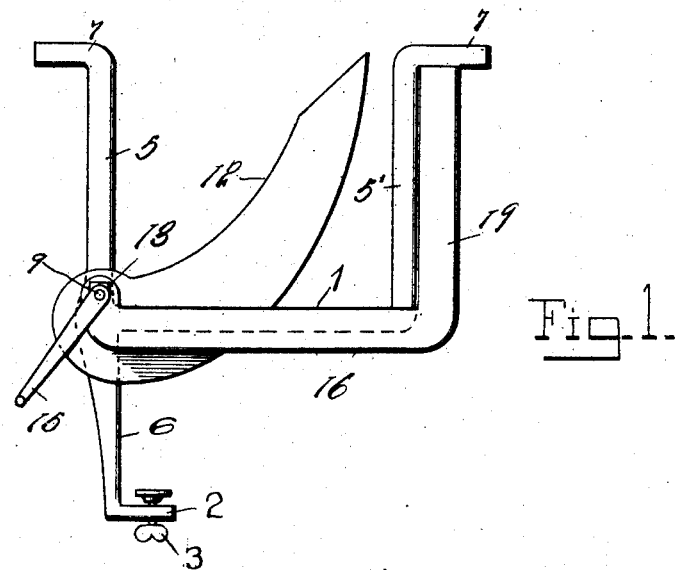
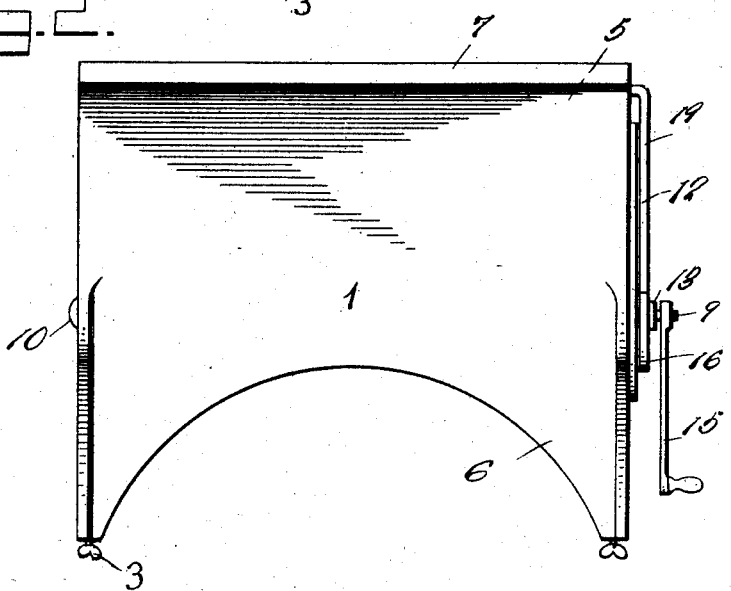
Witnesses
G. R. Thomas
F. B. MacKal
Inventor
D. F. Leidy
By Chandler & Chandler
Attorneys

D. F. LEIDY.
BREAD SLICER.
APPLICATION FILED APR. 19, 1906.

907,153.

Patented Dec. 22, 1908.
2 SHEETS—SHEET 2.

Inventor
D. F. Leidy

UNITED STATES PATENT OFFICE.

DANIEL F. LEIDY, OF CARRINGTON, NORTH DAKOTA.

BREAD-SLICER.

No. 907,153.　　　　　Specification of Letters Patent.　　　　Patented Dec. 22, 1908.

Application filed April 19, 1906.　Serial No. 312,681.

*To all whom it may concern:*

Be it known that I, DANIEL F. LEIDY, a citizen of the United States, residing at Carrington, in the county of Foster, State of North Dakota, have invented certain new and useful Improvements in Bread-Slicers; and I do hereby declare the following to be a full, clear, and exact description of the invention, such as will enable others skilled in the art to which it appertains to make and use the same.

This invention relates to devices for slicing bread or the like and has for its object to provide a device of this character having a novel form of guide for the slicing knife, the construction and arrangement of the guide being such that the knife will not be forced from its proper plane during its passage through the bread or the like.

Figure 3:
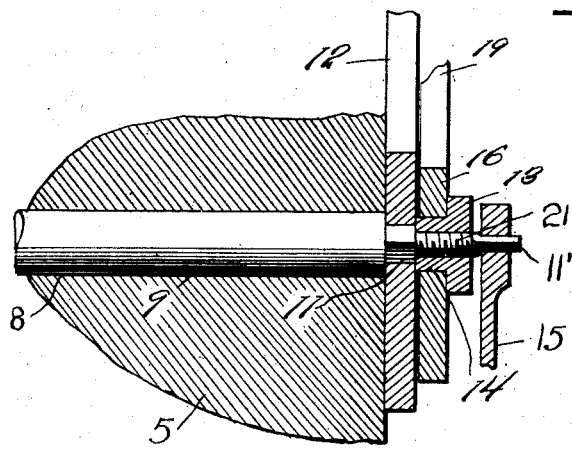
Figure 4:
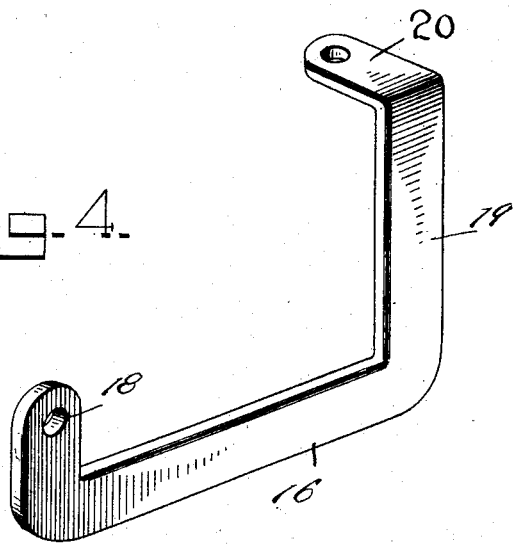

In the accompanying drawings: Figure 1 is an end elevation of the invention, Fig. 2 is a front view thereof, Fig. 3 discloses an enlarged broken detached sectional detail of the knife carrying shaft, and Fig. 4 is a detail perspective view of the guide-bracket.

In carrying out the object of my invention, I use a trough cast in one piece, comprising the base plate 1, the front panel 5 and the rear panel 5'. The front panel is projected downward, to form the securing ends 6 which are inwardly extended to provide at each end a securing foot 2, carrying a clamping screw 3 as shown in Fig. 1 and by means of which the device may be securely attached to a table or other support. The trough is open at its ends and has the upper edges of its panels turned outwardly as at 7.

Formed through the lower portion of the trough panel 5 and approximately in alinement with the top of the base plate 1, is a bore 8 in which is mounted for rotation a shaft 9 which is provided at one end with an enlarged head 10, as shown in Fig. 2 which bears against the end of the trough, the said shaft projecting beyond the other end of the trough and being provided with the reduced square shoulder portion 11 upon which is carried the crescent shaped blade 12. This blade 12 is provided with a square opening for the reception of the reduced squared shaft portion 11 whereby it will be rotated with the shaft. The shaft 9 is further provided with the threaded stem 21 adapted to receive the nut 13.

The blade 12 is held against movement from the shaft by means of the nut 13, which has a cylindrical hub-forming extension 14, the shaft terminating in the squared end 11'. The hub portion 14 is designed to clamp against the blade 12 while the shaft 9 is designed for rotation by means of a crank handle 15 which is engaged upon the forward square end of the shaft. By means of this arrangement the blade 12 in being rotated entirely passes below the top surface of the flat base 1, so that the loaf may be conveniently advanced in cutting the next slice.

In order to guide the knife 12 and hold it against movement from its proper plane of rotation, I provide a guide bracket member comprising a bar 16 provided at one of its ends with an opening 18 for the reception of the cylindrical extension 14 on the nut 13, this connection of the bracket with the nut serving to support this end of the guide and yet permitting free rotation of the shaft 9.

Extending upwardly from the bar 16 at right angles thereto is an arm 19 which has its upper perforated end 20 bent inwardly at right angles and is secured in any suitable manner to the edge 7 of the trough.

It will be seen that the knife is held during its rotation, between one end of the trough and the guide.

And having thus described my said invention, what I claim is—

The combination with an open ended trough, having a front and rear panel, said front panel being projected downward and provided at each end with a securing foot, a clamping screw passing through each foot, said front panel being provided with a bore approximately in alinement with the top of the base of said trough, a shaft passing through said bore and projecting beyond one end thereof, said shaft being provided with a reduced square portion, a threaded stem and a square end, a crescent shaped knife secured upon said squared portion, a nut threading upon said stem and bearing against said knife, a bracket carried at its forward end by said nut and secured at its rear end to the rear panel of said trough and a crank secured to said shaft end.

In testimony whereof, I affix my signature, in presence of two witnesses.

DANIEL F. LEIDY.

Witnesses:
　ROBT. R. PRYOR,
　N. W. GRAVES.